(12) United States Patent
Naiki et al.

(10) Patent No.: US 9,228,627 B2
(45) Date of Patent: Jan. 5, 2016

(54) VIBRATION-DAMPING RUBBER COMPOSITION, AND LIQUID-FILLED VIBRATION-DAMPING RUBBER DEVICE

(71) Applicant: TOKAI RUBBER INDUSTRIES, LTD., Komaki-shi, Aichi-ken (JP)

(72) Inventors: Hiroaki Naiki, Komaki (JP); Toyohisa Toyama, Komaki (JP); Norihito Kimura, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/202,593

(22) Filed: Mar. 10, 2014

(65) Prior Publication Data

US 2014/0191453 A1 Jul. 10, 2014

Related U.S. Application Data

(63) Continuation of application No. PCT/JP2013/050802, filed on Jan. 17, 2013.

(30) Foreign Application Priority Data

Feb. 27, 2012 (JP) .................. 2012-040053

(51) Int. Cl.
| | | |
|---|---|---|
| C08K 5/01 | (2006.01) | |
| F16F 13/00 | (2006.01) | |
| F16F 1/36 | (2006.01) | |
| F16F 13/10 | (2006.01) | |
| C08K 5/00 | (2006.01) | |
| F16F 13/08 | (2006.01) | |
| C08K 3/22 | (2006.01) | |
| C08L 91/00 | (2006.01) | |

(52) U.S. Cl.
CPC .............. *F16F 1/3605* (2013.01); *C08K 3/22* (2013.01); *C08K 5/0016* (2013.01); *C08K 5/01* (2013.01); *F16F 13/085* (2013.01); *F16F 13/10* (2013.01); *C08L 91/00* (2013.01); *F16F 2224/025* (2013.01)

(58) Field of Classification Search
CPC .............................. F16F 1/3605; F16F 13/085
USPC .......................................................... 524/484
See application file for complete search history.

(56) References Cited

FOREIGN PATENT DOCUMENTS

| | | | | |
|---|---|---|---|---|
| JP | 60-086136 A | | 5/1985 | |
| JP | 60086136 A | * | 5/1985 | .............. C08L 11/00 |
| JP | 05-140579 A | | 6/1993 | |
| JP | 07-286071 A | | 10/1995 | |
| JP | 07-301278 A | | 11/1995 | |
| JP | 09-235414 A | | 9/1997 | |
| JP | 2001-131341 A | | 5/2001 | |
| JP | 2001131341 A | * | 5/2001 | .............. C08L 11/00 |

OTHER PUBLICATIONS

Translation of JP2001-131341, May 15, 2001.*
Notification of Transmittal of the International Preliminary Report on Patentability (Form PCTIB/338) for PCT/JP2013/050802, with a mailing date of Sep. 12, 2014 and with Forms PCT/IB/373 and PCT/ISA/237 (6 pages).
International Search Report for PCT/JP2013/050802, Mailing Date of Feb. 26, 2013.
Office Action dated Jun. 9, 2015, issued in counterpart Japanese patent application No. 2012-040053; with English translation (4 pages).

* cited by examiner

*Primary Examiner* — Hui Chin
(74) *Attorney, Agent, or Firm* — Westerman, Hattori, Daniels & Adrian, LLP

(57) ABSTRACT

A vibration-damping rubber composition is provided, which is used as a material for a rubber member of a liquid-filled vibration-damping rubber device in which a glycol liquid is sealingly contained. The rubber composition comprises: (A) a chloroprene rubber as a major component; and (B) an aromatic hydrocarbon plasticizer. The rubber composition makes it possible to suppress increase in the hardness of the rubber member (chamber wall) after thermal aging and reduction in durability.

21 Claims, 1 Drawing Sheet

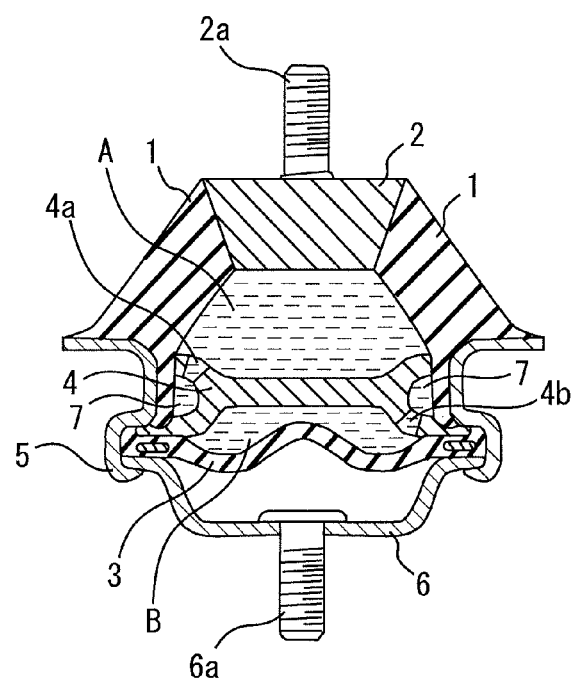

US 9,228,627 B2

VIBRATION-DAMPING RUBBER COMPOSITION, AND LIQUID-FILLED VIBRATION-DAMPING RUBBER DEVICE

RELATED APPLICATION

This application is a continuation of International Application No. PCT/JP2013/50802, filed on Jan. 17, 2013, which claims priority to Japanese Patent Application No. 2012-040053, filed on Feb. 27, 2012, the entire contents of each of which are hereby incorporated by reference.

BACKGROUND OF THE INVENTION

1. Field of the Invention

The present invention relates to a vibration-damping rubber composition to be used as a material for a rubber member (chamber wall) of a liquid-filled vibration-damping rubber device for use as an engine mount, a suspension bush or the like in an automotive vehicle, and to a liquid-filled vibration-damping rubber device produced by using the vibration-damping rubber composition.

2. Description of the Related Art

Vibration-damping rubber members such as an engine mount and a suspension bush, which are used as joint members for connection between various components such as an engine, a frame and the like in an automotive vehicle, exhibit a vibration-damping capability attributable to the spring property and the vibration attenuation property of a rubber body (vulcanized molded rubber body) thereof. In recent years, various types of vibration-damping rubber devices of a liquid-filled type (liquid-filled vibration-damping rubber devices) have been proposed which are further improved in vibration-damping capability over these vibration-damping rubber members by filling a liquid in the rubber devices (see, for example, JP-A-HEI5(1993)-140579 and JP-A-HEI7(1995)-301278).

Such a liquid-filled vibration-damping rubber device includes a rubber member (chamber wall) which is deformable according to inputted vibrations. A glycol liquid such as ethylene glycol is sealingly contained in a sealed space defined by the rubber member (chamber wall). In general, the rubber member is formed from a rubber composition prepared by blending a plasticizer and other substances with a rubber component such as a natural rubber or a styrene-butadiene rubber (SBR).

However, the plasticizer to be blended in the rubber composition is not very compatible with the rubber component such as the natural rubber and, therefore, liable to leach into the glycol liquid contained in the sealed space. Disadvantageously, this may result in increase in the hardness of the rubber member (chamber wall) after thermal aging, deterioration of vibration-damping capability, and reduction in durability.

SUMMARY OF THE INVENTION

In view of the foregoing, a vibration-damping rubber composition which can suppress the increase in the hardness of the rubber member (chamber wall) after the thermal aging and the reduction in durability is provided, and a liquid-filled vibration-damping rubber device produced by using the vibration-damping rubber composition is also provided.

Inventors of the present invention conducted intensive studies to provide a vibration-damping rubber composition which can suppress the increase in the hardness of the rubber member (chamber wall) after the thermal aging and the reduction in durability. First, the inventors focused on chloroprene rubbers which are more excellent in heat resistance than natural rubbers and diene rubbers such as SBR for use as the rubber component. Such a chloroprene rubber is generally used in combination with a phthalate plasticizer. However, the phthalate plasticizer is not very compatible with the chloroprene rubber, making it impossible to solve the aforementioned problem. Since the chloroprene rubber has a higher hardness than the natural rubber, the plasticizer is required in a greater amount and, therefore, has a significant influence. To cope with this, the inventors further conducted experiments on the plasticizer. As a result, the inventors found that an aromatic hydrocarbon plasticizer is highly compatible with the chloroprene rubber and incompatible with the glycol liquid, and attained the present invention.

According to a first aspect of the present invention, there is provided a vibration-damping rubber composition to be used as a material for a rubber member of a liquid-filled vibration-damping rubber device in which a glycol liquid is sealingly contained, the rubber composition comprising:
(A) a chloroprene rubber as a major component; and
(B) an aromatic hydrocarbon plasticizer.

According to a second aspect of the present invention, there is provided a liquid-filled vibration-damping rubber device comprising: a rubber member which defines a sealed space therein and is deformable according to inputted vibrations; and a glycol liquid sealingly contained in the sealed space, wherein the rubber member is formed from the vibration-damping rubber composition described above.

As described above, the rubber member (chamber wall) of the inventive liquid-filled vibration-damping rubber device in which the glycol liquid is sealingly contained is formed from the vibration-damping rubber composition comprising: (A) the chloroprene rubber as the major component; and (B) the aromatic hydrocarbon plasticizer. This suppresses the increase in the hardness of the rubber member (chamber wall) after the thermal aging and the reduction in durability, and improves the vibration-damping capability.

As the chloroprene rubber (A), a mercapto-modified chloroprene rubber, a xanthogen-modified chloroprene rubber, a sulfur-modified chloroprene rubber are preferred in this order for heat resistance. For dynamic characteristic properties, the sulfur-modified chloroprene rubber, the xanthogen-modified chloroprene rubber and the mercapto-modified chloroprene rubber are preferred in this order. Among these chloroprene rubbers, the xanthogen-modified chloroprene rubber is particularly preferred with the heat resistance and the dynamic characteristic properties thereof well balanced.

BRIEF DESCRIPTION OF THE DRAWING

FIG. 1 is a sectional view illustrating a liquid-filled vibration-damping mount as one embodiment of the inventive liquid-filled vibration-damping rubber device.

DETAILED DESCRIPTION OF THE INVENTION

An embodiment of the present invention will hereinafter be described in detail. However, it should be understood that the present invention be not limited to this embodiment.

The inventive vibration-damping rubber composition comprises:
(A) a chloroprene rubber as a major component; and
(B) an aromatic hydrocarbon plasticizer.

In the present invention, the term "major component" means a component that has a significant influence on the characteristic properties of the vibration-damping rubber composition. The component is usually present in a proportion of at least 50 wt % based on an overall weight of the vibration-damping rubber composition.

The inventive vibration-damping rubber composition is used as a material for a rubber member (chamber wall) of a liquid-filled vibration-damping rubber device in which a glycol liquid is sealingly contained.

In the present invention, the term "glycol liquid" means a liquid comprising a glycol solvent as a major component, and includes a liquid comprising a glycol solvent alone.

First, ingredients of the inventive vibration-damping rubber composition will be described.

<<Chloroprene Rubber (A)>>

The chloroprene rubber (A) is preferably a modified chloroprene rubber. Examples of the modified chloroprene rubber include a xanthogen-modified chloroprene rubber, a mercapto-modified chloroprene rubber and a sulfur-modified chloroprene rubber, which may be used either alone or in combination. Of these modified chloroprene rubbers, the mercapto-modified chloroprene rubber, the xanthogen-modified chloroprene rubber and the sulfur-modified chloroprene rubber are preferred in this order for heat resistance. For dynamic characteristic properties, the sulfur-modified chloroprene rubber, the xanthogen-modified chloroprene rubber and the mercapto-modified chloroprene rubber are preferred in this order. Particularly, the xanthogen-modified chloroprene rubber is preferred with the heat resistance and the dynamic characteristic properties thereof well balanced.

The xanthogen-modified chloroprene rubber is prepared, for example, by polymerizing a chloroprene monomer through emulsion polymerization to provide a chloroprene rubber while using an alkyl xanthogen compound as a molecular weight modifier.

Examples of the alkyl xanthogen include dimethyl xanthogen disulfide, diethyl xanthogen disulfide, diisopropyl xanthogen disulfide and diisobutyl xanthogen disulfide, which may be used either alone or in combination.

For the emulsion polymerization, a comonomer copolymerizable with the chloroprene monomer may be added to the chloroprene monomer. Examples of the comonomer include 2,3-dichloro-1,3-butadiene, 1-chloro-1,3-butadiene, sulfur, styrene, acrylonitrile, methacrylonitrile, isoprene, butadiene, acrylic acid, methacrylic acid, acrylates and methacrylates.

The emulsion polymerization is generally carried out in the presence of a polymerization initiator. Examples of the polymerization initiator include potassium persulfate, ammonium persulfate, sodium persulfate, hydrogen peroxide, and organic peroxides such as t-butyl hydroperoxide.

Examples of an emulsifier to be used for the emulsion polymerization include alkali metal salts of saturated or unsaturated $C_6$ to $C_{22}$ fatty acids, alkali metal salts of rosin acids or disproportionate rosin acids, and alkali metal salts of β-naphthalenesulfonic formaldehyde condensate.

A polymerization temperature for the emulsion polymerization is preferably 0° C. to 50° C., particularly preferably 20° C. to 50° C. The final conversion percentage of the monomer is preferably 60 to 90% and, when the conversion percentage is reached, a small amount of a polymerization inhibitor is added to stop the polymerization.

Examples of the polymerization inhibitor include thiodiphenylamine, 4-tert-butylcatechol and 2,2-methylene-bis-4-methyl-6-tert-butylphenol.

In the emulsion polymerization, unreacted monomers can be removed, for example, by a steam stripping method. Thereafter, the xanthogen-modified chloroprene rubber is isolated as a polymerization product by properly adjusting the pH of the resulting latex and performing a freezing coagulation step, a water rinsing step, a hot air drying step and the like in an ordinary manner.

<<Aromatic hydrocarbon Plasticizer (B)>>
<<Aromatic hydrocarbon Plasticizer (B)>>

In the present invention, the term "aromatic hydrocarbon plasticizer (B)" means a plasticizer comprising a carbon derived from aromatic hydrocarbons in a proportion of at least 32%, preferably at least 42%, based on an overall carbon content according to a carbon type analysis.

An aromatic oil is preferred as the aromatic hydrocarbon plasticizer (B) for higher compatibility with the chloroprene rubber (A).

The proportion of the aromatic hydrocarbon plasticizer (B) is preferably 3 to 30 parts by weight, particularly preferably 5 to 20 parts by weight, based on 100 parts by weight of the chloroprene rubber (A). If the proportion of the aromatic hydrocarbon plasticizer (B) is excessively low, it will be impossible to provide the kneading property and the rubber fluidity as desired. If the proportion of the aromatic hydrocarbon plasticizer (B) is excessively high, the aromatic hydrocarbon plasticizer (B) is liable to bleed.

The aromatic hydrocarbon plasticizer (B) preferably has a viscosity of 9 to 70 $mm^2/s$ (at 98.9° C.), particularly preferably 20 to 70 $mm^2/s$ (at 98.9° C.). If the viscosity of the aromatic hydrocarbon plasticizer (B) is excessively high, it will be impossible to provide the kneading property and the rubber fluidity as desired. If the viscosity of the aromatic hydrocarbon plasticizer (B) is excessively low, the aromatic hydrocarbon plasticizer (B) is liable to bleed.

The viscosity is measured at a temperature of 98.9° C. in conformity with JIS K2283.

The inventive vibration-damping rubber composition may contain a reinforcing material, a crosslinking agent, a vulcanization accelerating agent, a vulcanization acceleration assisting agent, an anti-aging agent and an acid accepting agent, as required, in addition to the chloroprene rubber (A) and the aromatic hydrocarbon plasticizer (B).

Examples of the reinforcing material include carbon black, calcium carbonate, talc and clay.

The proportion of the reinforcing material is generally 5 to 100 parts by weight, preferably 10 to 70 parts by weight, based on 100 parts by weight of the chloroprene rubber (A).

Examples of the crosslinking agent include zinc oxide, magnesium oxide and lead oxide.

The proportion of the crosslinking agent is generally 0.5 to 5 parts by weight, preferably 3 to 5 parts by weight, based on 100 parts by weight of the chloroprene rubber (A).

Examples of the vulcanization accelerating agent include thiazole vulcanization accelerating agents, sulfenamide vulcanization accelerating agents, thiuram vulcanization accelerating agents, aldehyde ammonia vulcanization accelerating agents, aldehyde amine vulcanization accelerating agents, guanidine vulcanization accelerating agents and thiourea vulcanization accelerating agents, which may be used either alone or in combination.

The proportion of the vulcanization accelerating agent is generally 0.1 to 10 parts by weight, preferably 0.3 to 5 parts by weight, based on 100 parts by weight of the chloroprene rubber (A).

Examples of the vulcanization acceleration assisting agent include zinc oxide, active zinc white and stearic acid, which may be used either alone or in combination.

The proportion of the vulcanization acceleration assisting agent is generally 0.1 to 10 parts by weight, preferably 0.3 to 5 parts by weight, based on 100 parts by weight of the chloroprene rubber (A).

Examples of the anti-aging agent include carbamate anti-aging agents, phenylenediamine anti-aging agents, phenol anti-aging agents, diphenylamine anti-aging agents, quinoline anti-aging agents, imidazole anti-aging agents and waxes, which may be used either alone or in combination.

The proportion of the anti-aging agent is generally 0.1 to 10 parts by weight, preferably 0.5 to 5 parts by weight, based on 100 parts by weight of the chloroprene rubber (A).

Examples of the acid accepting agent include magnesium oxide, hydrotalcites, zeolites, aluminum hydroxide, calcium oxide, calcium hydroxide, aluminum oxide, calcium carbonate, calcium silicate, basic silicon dioxide, magnesium hydroxide and zinc oxide, which may be used either alone or in combination.

The proportion of the acid accepting agent is generally 1 to 10 parts by weight, preferably 2 to 5 parts by weight, based on 100 parts by weight of the chloroprene rubber (A).

The inventive vibration-damping rubber composition can be prepared, for example, by blending the chloroprene rubber (A), the aromatic hydrocarbon plasticizer (B) and, as appropriate, the reinforcing material, the vulcanization accelerating agent, the vulcanization acceleration assisting agent, the anti-aging agent, the acid accepting agent and the like, and kneading the resulting mixture by means of a kneading machine such as a roll, a kneader, a Banbury mixer or a twin-screw kneader/extruder (for example, at 100° C. to 130° C. for 3 to 5 minutes).

Next, a liquid-filled vibration-damping rubber device produced by using the inventive vibration-damping rubber composition will be described.

The inventive liquid-filled vibration-damping rubber device includes a rubber member (chamber wall) which defines a sealed space therein and is deformable according to inputted vibrations, and a glycol liquid (filling liquid) is sealingly contained in the sealed space. A feature of the present invention is that the rubber member is formed from the inventive vibration-damping rubber composition as described above.

FIG. 1 illustrates one embodiment of the inventive liquid-filled vibration-damping rubber device, which is a liquid-filled vibration-damping mount in this embodiment. In FIG. 1, a reference numeral 1 designates a tubular vibration-damping rubber member having a large wall thickness. A primary liquid chamber A is defined in the vibration-damping rubber member 1. The vibration-damping rubber member 1 has an upper opening, in which a first metal joint member (metal fitting) 2 having a large thickness is inserted to close the upper opening. An upper end portion of the vibration-damping rubber member 1 and an outer peripheral surface of the first joint member 2 are bonded to each other with an adhesive agent or the like. A bolt 2a projects from an upper surface of the first joint member 2. The liquid-filled vibration-damping mount is to be connected to an engine (vibrating body) via the bolt 2a. An outer peripheral portion of the vibration-damping rubber member 1 is bonded to a tubular metal sideplate 5 (a part of a second metal joint member) with an adhesive agent. A thinner rubber diaphragm 3 is provided below the vibration-damping rubber member 1, and a secondary liquid chamber B is provided above the rubber diaphragm 3. The primary liquid chamber A and the secondary liquid chamber B are separated from each other by a partition plate 4. Outer peripheries of the partition plate 4, the rubber diaphragm 3 and a metal support plate 6 provided below the rubber diaphragm 3 are held in and clamped by a U-shaped lower edge portion of the side plate 5. The side plate 5 and the support plate 6 connected to the side plate 5 define the second metal joint member. A bolt 6a projects from a lower end of the support plate 6. The liquid-filled vibration-damping mount is to be connected to a vehicle main body (base body) via the bolt 6a. The primary liquid chamber A and the secondary liquid chamber B are filled with a glycol liquid. Further, a liquid flow passage 7 is provided in an outer peripheral portion of the partition plate 4. The liquid flow passage 7 communicates with the primary liquid chamber A and the secondary liquid chamber B through communication holes 4a and 4b, respectively, which are provided in the partition plate 4. When the vibration-damping rubber member 1 is deformed due to inputted vibrations, the glycol liquid flows between the liquid chambers A and B through the liquid flow passage 7 to attenuate the vibrations.

As described above, the present invention has the feature such that the rubber member including the vibration-damping rubber member 1 and the rubber diaphragm 3 defining the chamber wall as shown in FIG. 1 is formed from the inventive vibration-damping rubber composition.

The rubber member including the vibration-damping rubber member 1 and the rubber diaphragm 3 is produced by vulcanizing the vibration-damping rubber composition prepared in the aforementioned manner at a high temperature (150° C. to 170° C.) for 5 to 30 minutes. The liquid-filled vibration-damping rubber device shown in FIG. 1 can be produced by employing the rubber member.

Examples of the glycol liquid to be sealingly contained in the primary liquid chamber A and the secondary liquid chamber B include glycol solvents such as ethylene glycol (EG) and propylene glycol (PG), and solutions prepared by adding water or the like to any of these glycol solvents as appropriate.

A preferred example of the glycol solvent is a mixture of ethylene glycol (EG) and propylene glycol (PG), preferably a mixture prepared by mixing ethylene glycol (EG) and propylene glycol (PG) wherein a mixing weight ratio of EG/PG is from 7/3 to 5/5.

EXAMPLES

The present invention will hereinafter be described more specifically by way of examples thereof. It should be understood that the present invention is not limited to these examples and may be implemented in various other embodiments without departing the scope of the invention. In the examples, the precentages (%) are based on weight.

The following materials were prepared for the inventive examples and the comparative examples.

<Chloroprene Rubber (A)>

A xanthogen-modified chloroprene rubber (DCR-66 available from Denki Kagaku Kogyo K.K.)

<Aromatic Hydrocarbon Plasticizer (B1)>

An aromatic oil (FUCCOL AROMAX #3 available from JX Nippon Oil & Energy Corporation and having a viscosity of 24.5 mm$^2$/s (at 98.9° C.)) characterized by 43% aromatic carbon, 29.5% naphthenic carbon and 27.5% paraffinic carbon according to the carbon type analysis.

<Aromatic Hydrocarbon Plasticizer (B2)>

An aromatic oil (FUCCOL AROMAX #1 available from JX Nippon Oil & Energy Corporation and having a viscosity of 9.3 mm$^2$/s (at 98.9° C.)) characterized by 42% aromatic carbon, 33% naphthenic carbon and 25% paraffinic carbon according to the carbon type analysis.

<Aromatic Hydrocarbon Plasticizer (B3)>

An aromatic oil (FUCCOL AROMAX #5 available from JX Nippon Oil & Energy Corporation and having a viscosity of 58.2 mm$^2$/s (at 98.9° C.)) characterized by 43% aromatic carbon, 26% naphthenic carbon and 31% paraffinic carbon according to the carbon type analysis.

<Naphthenic Oil (B'1)>

A naphthenic oil (SUNSEN 410 available from Japan Sun Oil Co., Ltd. and having a viscosity of 38.0 SUS (at 98.9° C.)) characterized by 15% aromatic carbon, 42% naphthenic carbon and 43% paraffinic carbon according to the carbon type analysis.

<Paraffinic Pil (B'2)>

A paraffinic oil (DIANA PROCESS OIL PW90 available from Idemitsu Kosan Co., Ltd. and having a viscosity of 11.25 mm$^2$/s (at 98.9° C.)) characterized by 0% aromatic carbon, 29% naphthenic carbon and 71% paraffinic carbon according to the carbon type analysis.

<Acid Accepting Agent>

KYOWA MAG #150 available from Kyowa Chemical Industry Co., Ltd.

<Vulcanization accelerating agent 1>

SANCELER 22C, which is a thiourea vulcanization accelerating agent, available from Sanshin Chemical Industry Co., Ltd.

<Vulcanization accelerating agent 2>

SOXINOL CZ, which is a sulfenamide vulcanization accelerating agent, available from Sumitomo Chemical Co., Ltd.

<Anti-Aging Agent>

OZONON 6C available from Seiko Chemical Co., Ltd.

<Carbon Black>

SEAST SO available from Tokai Carbon Co., Ltd.

<Vulcanization Acceleration Assisting Agent (i)>

LUNAC S30 available from Kao Corporation

<Vulcanization Acceleration Assisting Agent (ii)>

Zinc Oxide TYPE II

Example 1

The chloroprene rubber (A), the aromatic hydrocarbon plasticizer (B1), the acid accepting agent, the anti-aging agent, the carbon black and the vulcanization acceleration assisting agent (i) were blended together in proportions as shown below in Table 1, and the resulting mixture was kneaded at 140° C. for 5 minutes by means of a Banbury mixer. Then, other ingredients were blended with the mixture in proportions as shown below in Table 1, and the resulting mixture was kneaded at 60° C. for 5 minutes by means of an open roll. Thus, a vibration-damping rubber composition was prepared.

Examples 2 to 5 and Comparative Examples 1 and 2

Vibration-damping rubber compositions were prepared in substantially the same manner as in Example 1, except that the types and the proportions of the ingredients were changed as shown below in Table 1.

TABLE 1

|  | Example | | | | | Comparative Example | |
|---|---|---|---|---|---|---|---|
|  | 1 | 2 | 3 | 4 | 5 | 1 | 2 |
| Chloroprene rubber (A) | 100 | 100 | 100 | 100 | 100 | 100 | 100 |
| Aromatic hydrocarbon plasticizer (B1) | 3 | 30 | 15 | — | — | — | — |
| Aromatic hydrocarbon plasticizer (B2) | — | — | — | 15 | — | — | — |
| Aromatic hydrocarbon plasticizer (B3) | — | — | — | — | 15 | — | — |
| Naphthenic oil (B'1) | — | — | — | — | — | 15 | — |
| Paraffinic oil (B'2) | — | — | — | — | — | — | 15 |
| Acid accepting agent | 4 | 4 | 4 | 4 | 4 | 4 | 4 |
| Vulcanization accelerating agent 1 | 0.5 | 0.5 | 0.5 | 0.5 | 0.5 | 0.5 | 0.5 |
| Vulcanization accelerating agent 2 | 5 | 5 | 5 | 5 | 5 | 5 | 5 |
| Anti-aging agent | 1 | 1 | 1 | 1 | 1 | 1 | 1 |
| Carbon black | 40 | 40 | 40 | 40 | 40 | 40 | 40 |
| Vulcanization acceleration assisting agent (i) | 2 | 2 | 2 | 2 | 2 | 2 | 2 |
| Vulcanization acceleration assisting agent (ii) | 0.5 | 0.5 | 0.5 | 0.5 | 0.5 | 0.5 | 0.5 |
| Increase in hardness after thermal aging | +8 | +9 | +8 | +9 | +8 | +17 | +15 |
| (Evaluation) | ○ | ○ | ○ | ○ | ○ | x | x |
| Increase in hardness after immersion | +4 | +5 | +4 | +5 | +4 | +13 | +14 |
| (Evaluation) | ○ | ○ | ○ | ○ | ○ | Δ | x |

Products of the inventive examples and the comparative examples thus produced were each evaluated for characteristic properties on the basis of the following criteria. The results are also shown above in Table 1.

<Increase in Hardness After Thermal Aging>

After the vibration-damping rubber composition was thermally aged at 120° C. for 96 hours, a change (ΔHs) in the hardness of the vibration-damping rubber composition was measured. In evaluation, a vibration-damping rubber composition having a hardness increase (ΔHs) of not greater than +14 was rated as excellent (○), and a vibration-damping rubber composition having a hardness increase (ΔHs) of +15 or greater was rated as unacceptable (x).

<Increase in Hardness After Immersion>

After the vibration-damping rubber composition was immersed in a glycol liquid (EG/PG=5/5) at 100° C. for 70 hours, a change (ΔHs) in the hardness of the vibration-damping rubber composition was measured. In evaluation, a vibration-damping rubber composition having a hardness increase (ΔHs) of not greater than +10 was rated as excellent (○), and a vibration-damping rubber composition having a hardness increase (ΔHs) of greater than +10 and not greater than +13 was rated as acceptable (Δ). Further, a vibration-damping rubber composition having a hardness increase (ΔHs) of +14 or greater was rated as unacceptable (x).

The results shown in Table 1 indicate that the products of the inventive examples prepared by employing the aromatic hydrocarbon plasticizer (B) were excellent in vibration-damping capability and durability with a reduced hardness increase after the thermal aging and a reduced hardness increase after the immersion. This is presumably because the aromatic hydrocarbon plasticizer is highly compatible with the chloroprene rubber and is incompatible with ethylene glycol (EG) and propylene glycol (PG).

The products of Comparative Examples 1 and 2, which were prepared by employing a plasticizer other than the aromatic hydrocarbon plasticizer (B), i.e., the naphthenic oil and the paraffinic oil, were poorer in vibration-damping capability and durability with a greater hardness increase after the thermal aging and a greater hardness increase after the immersion. This is presumably because the naphthenic oil and the paraffinic oil are compatible with EG and PG.

While specific forms of the embodiment of the present invention have been shown in the aforementioned inventive examples, the inventive examples are merely illustrative of the invention but not limitative of the invention. It is contemplated that various modifications apparent to those skilled in the art could be made within the scope of the invention.

The inventive vibration-damping rubber composition can be advantageously used as a material for a rubber member (chamber wall) of a liquid-filled vibration-damping rubber device such as an engine mount, a suspension bush, a body mount, a subframe mount or a differential mount for use in an automotive vehicle.

What is claimed is:

1. A vibration-damping rubber composition to be used as a material for a rubber member of a liquid-filled vibration-damping rubber device in which a glycol liquid is sealingly contained, the rubber composition comprising:
   (A) a chloroprene rubber as a major component; and
   (B) an aromatic hydrocarbon plasticizer having a viscosity of 9 to 70 mm$^2$/s when measured at a temperature of 98.9° C. in conformity with JIS K2283.

2. The vibration-damping rubber composition according to claim 1, wherein the aromatic hydrocarbon plasticizer (B) is present in a proportion of 3 to 30 parts by weight based on 100 parts by weight of the chloroprene rubber (A).

3. The vibration-damping rubber composition according to claim 1, wherein the chloroprene rubber (A) is at least one selected from the group consisting of a xanthogen-modified chloroprene rubber, a mercapto-modified chloroprene rubber and a sulfur-modified chloroprene rubber.

4. The vibration-damping rubber composition according to claim 1, wherein the aromatic hydrocarbon plasticizer (B) comprises a carbon derived from an aromatic hydrocarbon in a proportion of at least 32% based on an overall carbon content according to a carbon type analysis.

5. The vibration-damping rubber composition according to claim 1, further comprising at least one reinforcing material selected from the group consisting of carbon black, calcium carbonate, talc and clay.

6. The vibration-damping rubber composition according to claim 1, further comprising a reinforcing material in a proportion of 5 to 100 parts by weight based on 100 parts by weight of the chloroprene rubber (A).

7. The vibration-damping rubber composition according to claim 1, further comprising at least one crosslinking agent selected from the group consisting of zinc oxide, magnesium oxide and lead oxide.

8. The vibration-damping rubber composition according to claim 1, further comprising a crosslinking agent in a proportion of 0.5 to 5 parts by weight based on 100 parts by weight of the chloroprene rubber (A).

9. The vibration-damping rubber composition according to claim 1, further comprising at least one vulcanization accelerating agent selected from the group consisting of a thiazole vulcanization accelerating agent, a sulfenamide vulcanization accelerating agent, a thiuram vulcanization accelerating agent, an aldehyde ammonia vulcanization accelerating agent, an aldehyde amine vulcanization accelerating agent, a guanidine vulcanization accelerating agent and a thiourea vulcanization accelerating agent.

10. The vibration-damping rubber composition according to claim 1, further comprising a vulcanization accelerating agent in a proportion of 0.1 to 10 parts by weight based on 100 parts by weight of the chloroprene rubber (A).

11. The vibration-damping rubber composition according to claim 1, further comprising at least one vulcanization acceleration assisting agent selected from the group consisting of zinc oxide, active zinc white and stearic acid.

12. The vibration-damping rubber composition according to claim 1, further comprising a vulcanization acceleration assisting agent in a proportion of 0.1 to 10 parts by weight based on 100 parts by weight of the chloroprene rubber (A).

13. The vibration-damping rubber composition according to claim 1, further comprising at least one anti-aging agent selected from the group consisting of a carbamate anti-aging agent, a phenylenediamine anti-aging agent, a phenol anti-aging agent, a diphenylamine anti-aging agent, a quinoline anti-aging agent, an imidazole anti-aging agent and a wax.

14. The vibration-damping rubber composition according to claim 1, further comprising an anti-aging agent in a proportion of 0.1 to 10 parts by weight based on 100 parts by weight of the chloroprene rubber (A).

15. The vibration-damping rubber composition according to claim 1, further comprising at least one acid accepting agent selected from the group consisting of magnesium oxide, a hydrotalcite, a zeolite, aluminum hydroxide, calcium oxide, calcium hydroxide, aluminum oxide, calcium carbonate, calcium silicate, basic silicon dioxide, magnesium hydroxide and zinc oxide.

16. The vibration-damping rubber composition according to claim 1, further comprising an acid accepting agent in a proportion of 1 to 10 parts by weight based on 100 parts by weight of the chloroprene rubber (A).

17. A liquid-filled vibration-damping rubber device comprising:
   a rubber member which defines a sealed space therein and is deformable according to inputted vibrations; and
   a glycol liquid sealingly contained in the sealed space;
   wherein the rubber member comprises the vibration-damping rubber composition according to claim 1.

18. The liquid-filled vibration-damping rubber device according to claim 17, wherein the sealingly contained glycol liquid comprises at least one of ethylene glycol (EG) and propylene glycol (PG).

19. The liquid-filled vibration-damping rubber device according to claim 17, wherein the sealingly contained glycol liquid is a mixture prepared by mixing ethylene glycol (EG) and propylene glycol (PG) wherein a mixing weight ratio of EG/PG is from 7/3 to 5/5.

20. The vibration-damping rubber composition according to claim 1, wherein the aromatic hydrocarbon plasticizer (B) comprises a carbon derived from a paraffinic carbon in a proportion of no more than 31% based on the overall carbon content according to the carbon type analysis.

21. The vibration-damping rubber composition according to claim 1, further comprising a sulfenamide vulcanization acceleration agent.

* * * * *